United States Patent
Freed

(10) Patent No.: US 10,383,340 B2
(45) Date of Patent: Aug. 20, 2019

(54) ROUNDER BAR WITH BLADE HAVING ZONAL ADJUSTMENT TO CONTROL DOUGH LEAKAGE

(71) Applicant: Machine Specialties, Inc., Ashland, VA (US)

(72) Inventor: Hunter Freed, Mechanicsville, VA (US)

(73) Assignee: MACHINE SPECIALTIES, INC., Ashland, VA (US)

( * ) Notice: Subject to any disclaimer, the term of this patent is extended or adjusted under 35 U.S.C. 154(b) by 0 days.

(21) Appl. No.: 15/987,476

(22) Filed: May 23, 2018

(65) Prior Publication Data

US 2019/0008166 A1  Jan. 10, 2019

Related U.S. Application Data

(60) Provisional application No. 62/477,478, filed on Mar. 28, 2017.

(51) Int. Cl.
  *A21C 7/01* (2006.01)
  *A21C 7/02* (2006.01)
  *A21C 9/08* (2006.01)

(52) U.S. Cl.
  CPC .................. *A21C 9/08* (2013.01); *A21C 7/01* (2013.01); *A21C 7/02* (2013.01)

(58) Field of Classification Search
  CPC .................................... A21C 7/01; A21C 7/02
  USPC .......................................................... 425/332
  See application file for complete search history.

(56) References Cited

U.S. PATENT DOCUMENTS

| | | | |
|---|---|---|---|
| 4,008,025 A | 2/1977 | Campbell | |
| 4,306,850 A | 12/1981 | Cummins | |
| 5,714,178 A | 2/1998 | Keener | |
| 5,786,016 A | 7/1998 | Campbell et al. | |
| 6,159,517 A | 12/2000 | Watts et al. | |
| 6,344,227 B1 | 2/2002 | Schmidt | |
| 6,506,042 B1 | 1/2003 | Watts | |
| 6,616,439 B2 * | 9/2003 | Oki | A21C 7/01 425/183 |

\* cited by examiner

*Primary Examiner* — James P Mackey
(74) *Attorney, Agent, or Firm* — Jackson Patent Group, LLC

(57) ABSTRACT

A rounder bar including a blade in continuous contact with a conveyor for forming dough into various shapes. An adjustable footer on the rounder bar includes a plurality of adjustment tools that can be adjusted in selectable zones to minimize dough leakage in any selected zone across the length of the rounder bar. Each adjustment tool is connected to a corresponding locking plate that is disposed in a recess in the blade. The pressure of the blade against the conveyor in a particular zone is responsive to rotation of the adjustment tool in that particular zone, enabling adjustment of dough leakage in that zone.

20 Claims, 7 Drawing Sheets

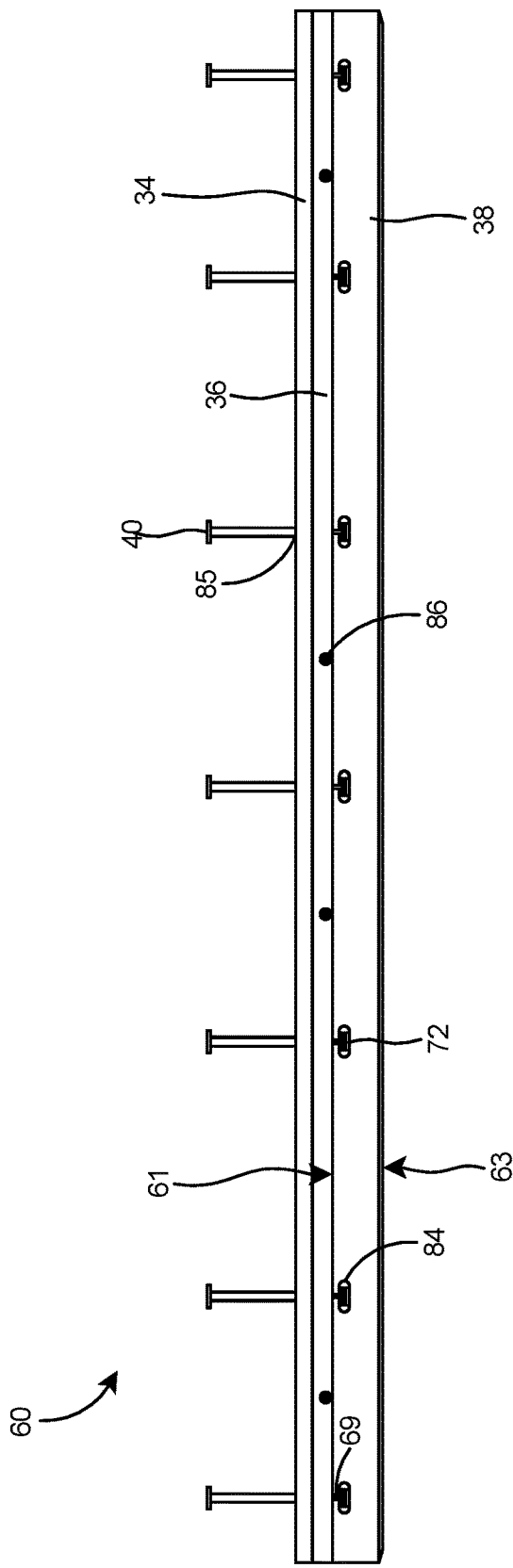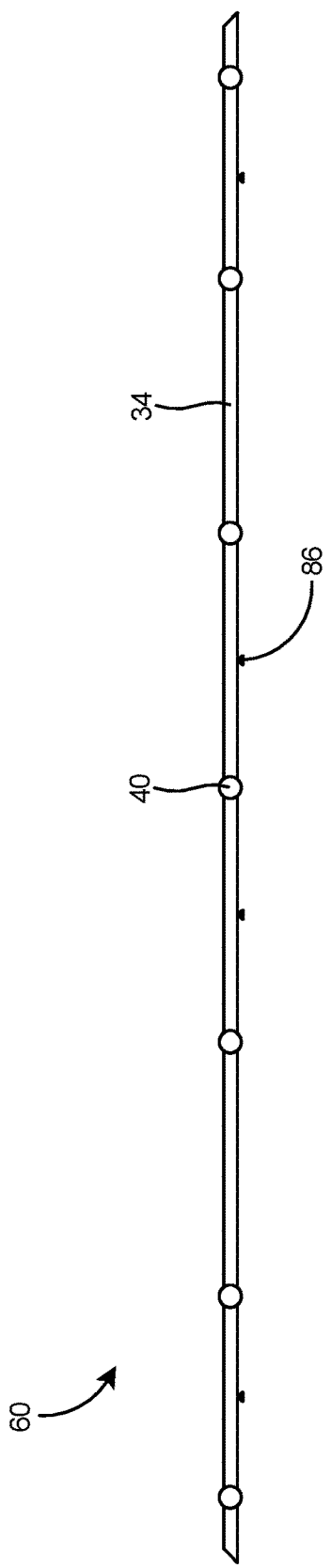

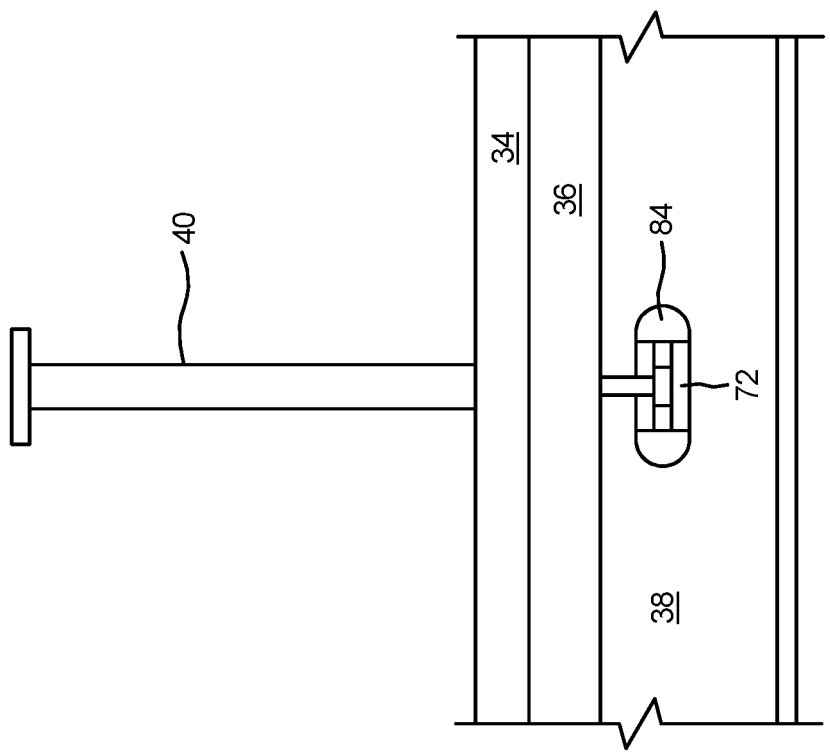
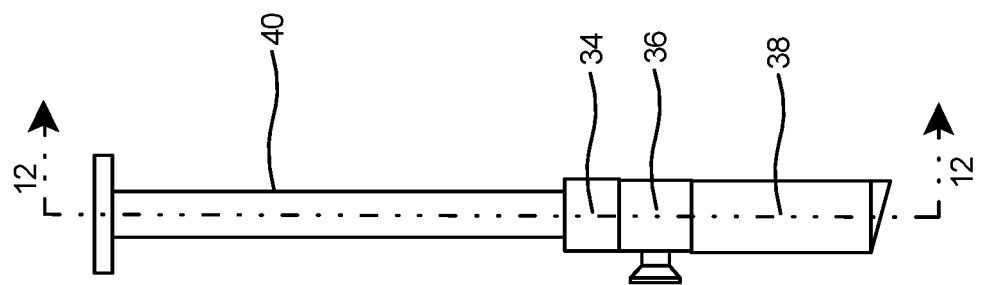

ROUNDER BAR WITH BLADE HAVING ZONAL ADJUSTMENT TO CONTROL DOUGH LEAKAGE

CROSS-REFERENCE TO RELATED APPLICATIONS

This application claims priority to provisional U.S. Application No. 62/477,478, filed Mar. 28, 2017, the contents of which are incorporated herein by reference in their entirety.

FIELD OF THE INVENTION

This invention relates to the shaping of dough for processing into baked goods and specifically to a rounder bar with a blade having zonal adjustment to eliminate dough leakage between a rounder bar and a conveyor belt.

BACKGROUND OF THE INVENTION

Rounder bars are commonly used in cooperation with an endless conveyor in the baking industry for forming dough into various shapes. As the dough is formed by the rounder bar, a blade is typically pressed against the surface of the conveyor in order to wipe the surface of the conveyor clean as the dough is formed.

Conventional rounder bars are typically mounted to a support structure that is fixed above the conveyor. The rounder bars are typically secured to the support structure by brackets and one or more fasteners, thereby placing the rounder bars and the blade in a fixed position with respect to the conveyor.

Unfortunately, it has been found that as conventional dough-shaping equipment is operated, various factors such as wear and tear of the equipment, such as the conveyor belt surface, the drive and idler rollers, and various other factors cause irregularities that enable dough leakage to occur between the blade and the conveyor belt surface. Although conventional rounder bars have been fitted with floating blades to wipe the conveyor belt surface, the entirety of the blade must be adjusted with respect to the conveyor belt surface, and the blades are not capable of compensating for localized irregularities in the conveyor belt surface.

Accordingly, it is an object of the present invention to provide a rounder bar that can be adjusted in selected zones to compensate for dough leakage in localized areas across the conveyor belt.

BRIEF SUMMARY OF THE INVENTION

The present invention is a rounder bar having a blade in continuous contact with a conveyor for forming dough into various shapes. An adjustable footer on the rounder bar includes a plurality of adjustment tools that can be adjusted in selectable zones to minimize dough leakage in any selected zone across the length of the rounder bar. Each adjustment tool is connected to a corresponding locking plate that is disposed in a recess in the blade. The pressure of the blade against the conveyor in a particular zone is responsive to rotation of the adjustment tool in that particular zone, enabling adjustment of dough leakage in that zone.

OBJECTS AND ADVANTAGES

A first object of the invention is to provide a rounder bar that can be adjusted in selected zones to compensate for dough leakage in localized areas across the conveyor belt.

A second object of the invention is to provide a rounder bar that includes a series of adjustment tools across the length of the rounder bar which can be selectively adjusted as needed to compensate for dough leakage in specific areas across the conveyor belt.

A further object of the invention is to provide a rounder bar that includes a series of adjustment tools that may be easily manipulated by an operator to provide adjustment of a wiper blade in specific zones with respect to the conveyor belt.

Another object of the invention is to provide a rounder bar that includes a blade, an adjustment plate, and a resilient layer that is capable of compressing or expanding as the blade is adjusted with respect to the conveyor belt.

These and other objects and advantages of the present invention will be better understood by reading the following description along with reference to the drawings.

DESCRIPTION OF THE DRAWINGS

FIG. 8 is a side view of the adjustable footer assembly.

FIG. 9 is a top view of the adjustable footer assembly.

FIG. 10 is an end view of the adjustable footer assembly.

FIG. 11 is a side view of a portion of the adjustable footer assembly depicting an adjustment tool.

DETAILED DESCRIPTION OF THE INVENTION

Figure 1:
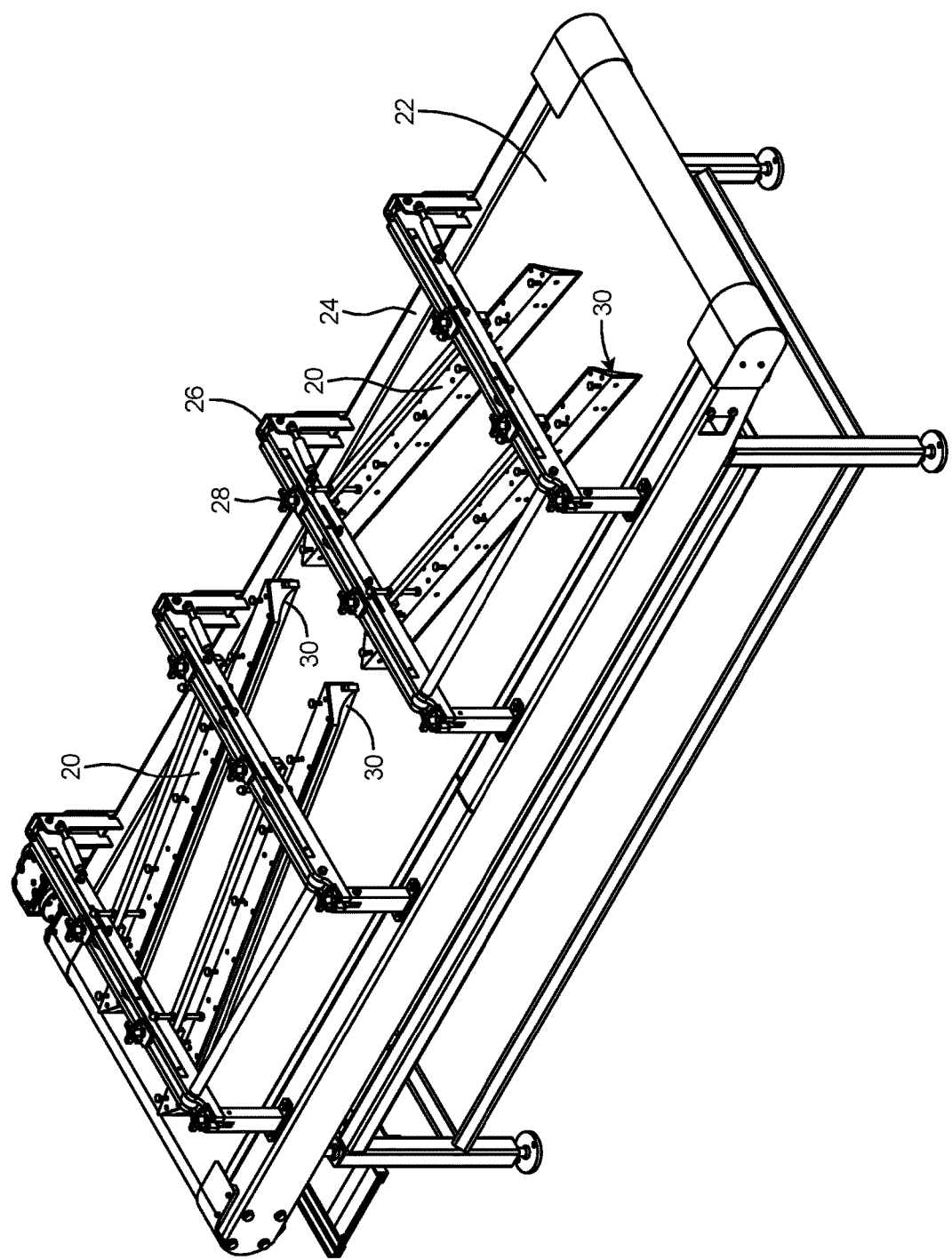
FIG. 1 is an isometric view of a plurality of rounder bar assemblies according to the present invention mounted above an endless conveyor belt.

With reference to FIG. 1, a plurality of rounder bar assemblies 20 according to the present invention are shown mounted above an endless conveyor belt 22. The rounder bar assemblies 20 are mounted to the framework 24 of the endless conveyor belt 22 by a plurality of brackets 26 and mounting bolts 28. Each rounder bar assembly 20 includes a working face 30 that shapes dough pieces as they are carried along the conveyor belt.

Figure 2:
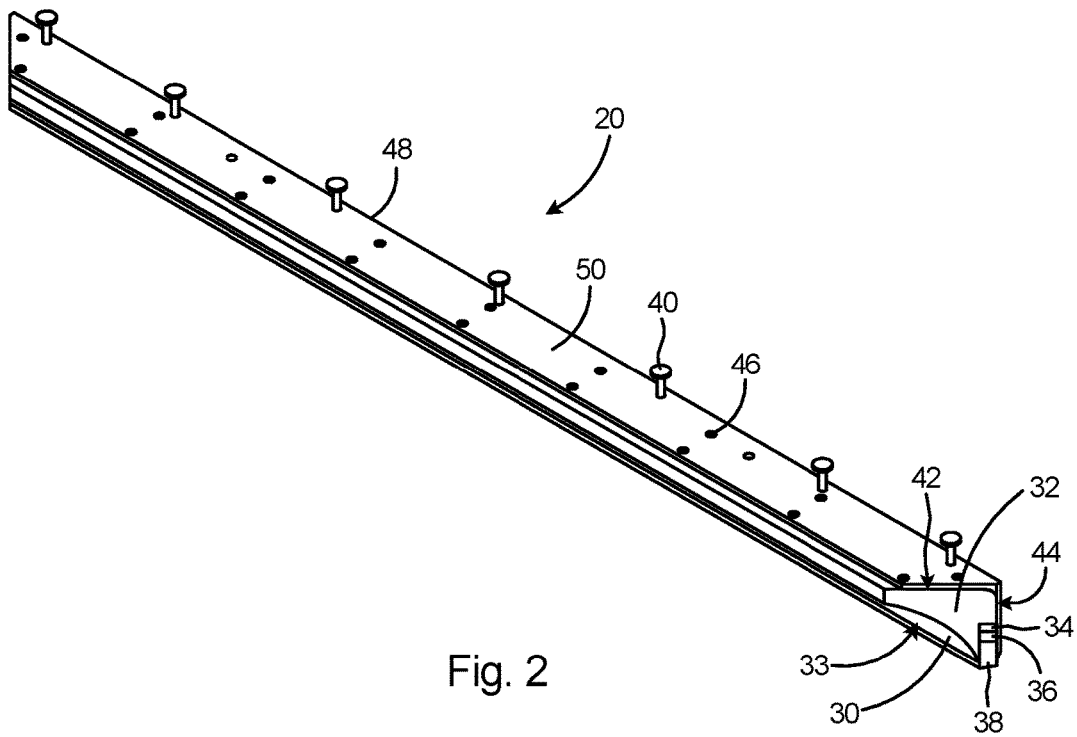
FIG. 2 is an isometric view of a rounder bar assembly according to the present invention.
Figure 3:
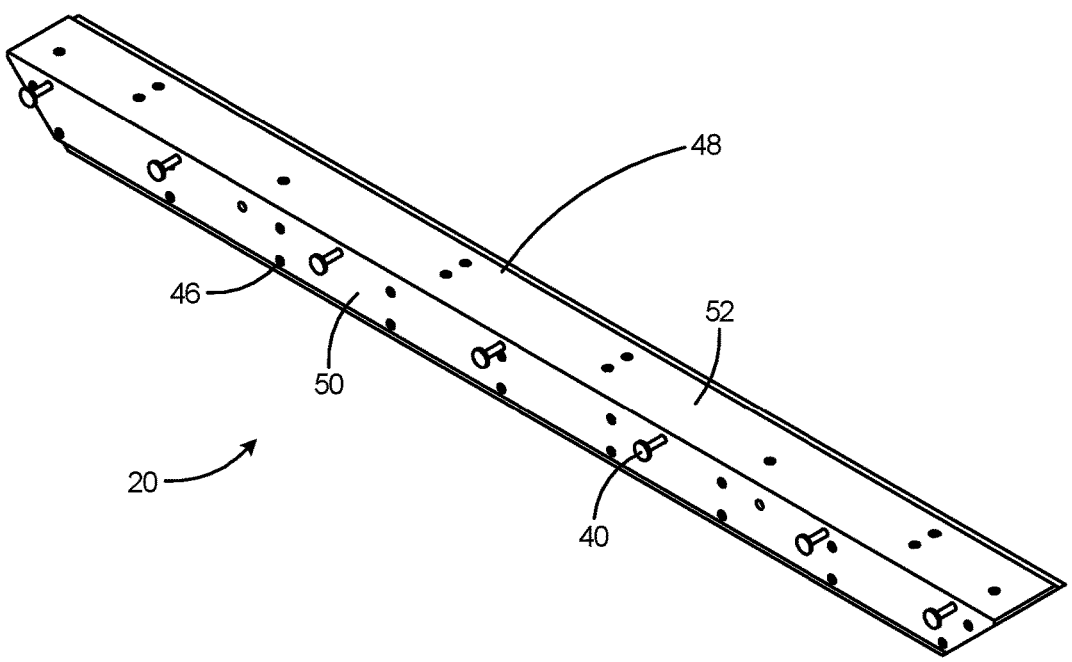
FIG. 3 is an alternate isometric view of the rounder bar assembly of FIG. 2.

Referring to FIGS. 2 and 3, the rounder bar assembly 20 according to the present invention includes an elongated rounder bar body 32 including the working face 30 that cooperates with the conveyor 22 to define a pocket 33 for dough to be formed, a resilient strip 34, an adjustment plate 36, a blade 38, and a plurality of adjustment tools 40 for providing zonal adjustment of the blade 38 with respect to the adjustment plate 36. The rounder bar body 32 includes a horizontal face 42 and a vertical face 44. The rounder bar body 32 is secured by attachment means 46, such as fasteners or similar attachment means, to a support plate 48, which includes a horizontal member 50 and a vertical member 52. It is within the scope of the invention that rounder bar body 32, horizontal member 50 and vertical member 52 can be provided in one-piece. The slot 62 includes a top end 57 and an open end 59. The resilient strip 34 is disposed in the top end 57 of the slot 62. The adjustment plate 36 is disposed in the slot 62 in contact with the resilient strip 34. The blade 38, disposed in the open end 59 of the slot 62, functions to wipe the surface of the conveyor.

Figure 4:
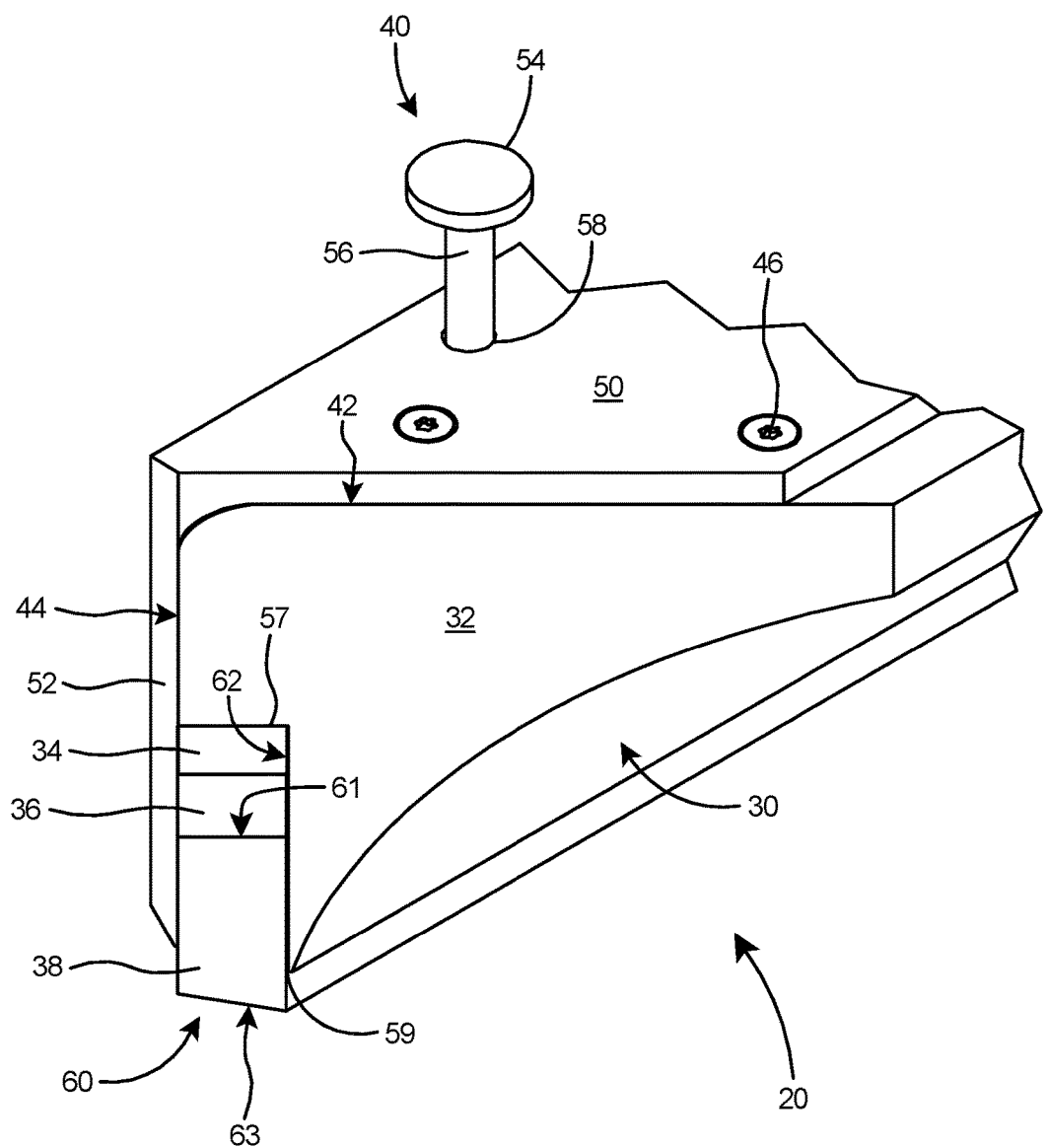
FIG. 4 is an isometric end view of an end portion of the rounder bar assembly.

With reference to FIG. 4, each adjustment tool 40 includes grasping means 53 including a head 54 and a shaft 56, with the shaft 56 extending through an oversize aperture 58 in the support plate 48. Resilient strip 34, adjustment plate 36, and blade 38 collectively form an adjustable footer assembly 60 which fits within a slot 62 formed between rounder bar assembly 20 and vertical member 52 of support plate 48.

As shown in FIG. 8, the blade 38 includes a continuous and planar top edge 61 and a wiping edge 63 that will contact the surface of a conveyor belt. The wiping edge 63 of blade is preferably serrated. The meaning of the term "continuous top edge" is that, other than the small bores 69 (see FIG. 12) passing through the blade 38 for accommodating the pins 68 of the adjustment tools 40, there are no recesses or indentations in the top edge 61 of the blade 38. Thus, as shown in FIG. 12, there is intimate contact between the blade 38 and adjustment plate 36, between the adjustment plate 36 and resilient strip 34, and between the resilient strip 34 and the rounder bar body 32.

Figure 5:
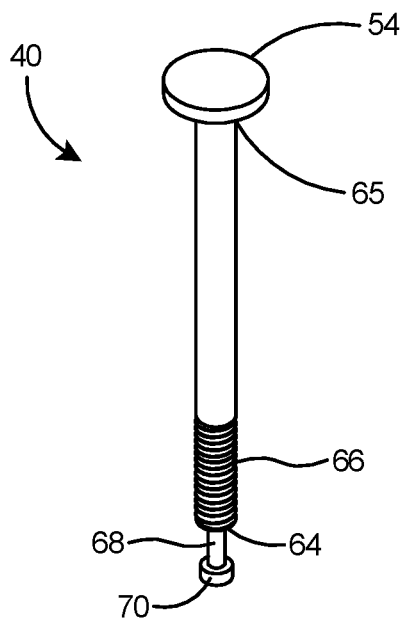
FIG. 5 is an isometric view of an adjustment tool assembly according to the present invention.
Figure 7:
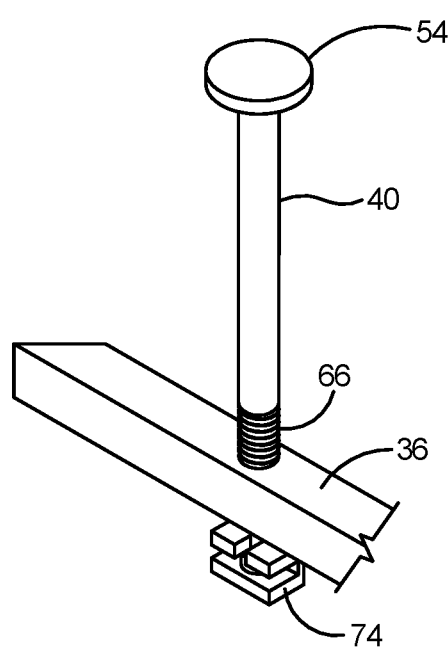
FIG. 7 is a detail isometric view of the distal end of the adjustment tool assembly.
Figure 6:
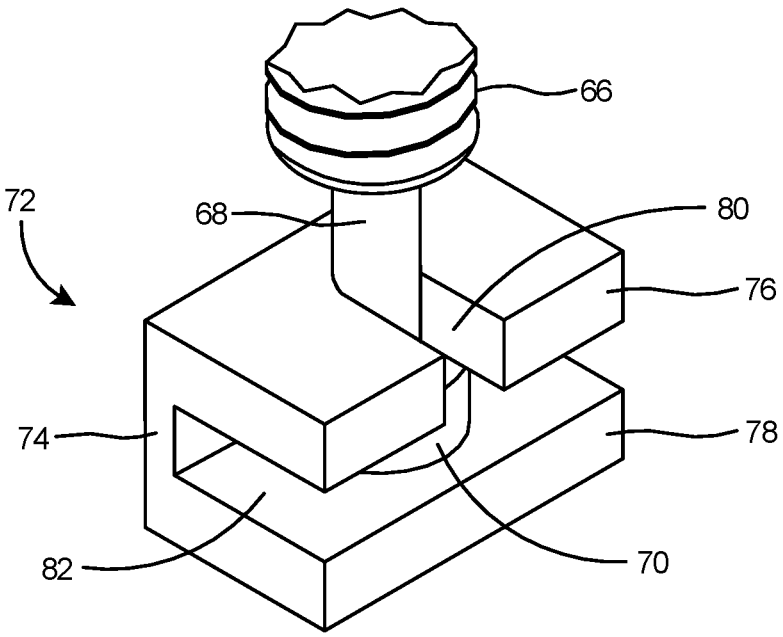
FIG. 6 is an isometric view of the adjustment tool and adjustment plate assembly according to the present invention.

Referring to FIGS. 5-7, adjustment tool 40 includes a proximal end 65 and a distal end 64 with threads 66. A pin 68 extends from the distal end 64 of the adjustment tool 40 and includes a flange 70 of wider diameter than the pin. As shown in FIG. 6, pin 68 and flange 70 are adapted to engage a locking plate 72 to form an adjustable footer assembly according to the present invention. Locking plate 72 includes a base 74, a top leg 76 and bottom leg 78 extending from the base, a vertical slot 80 in the top leg 76, and a horizontal slot 82 between the top and bottom legs. An adjustable footer assembly is formed by sliding flange 70 within vertical slot 80 and a horizontal slot 82 of locking plate 72.

With reference to FIGS. 8-9, adjustable footer assembly 60 is an assembly of the resilient strip 34, adjustment plate 36, and blade 38, connected by a plurality of adjustment tools 40. The blade 38 includes a plurality of recesses 84 along its length. A locking plate 72 is provided in each recess 84 to engage a corresponding adjustment tool 40. Each adjustment tool 40 extends through an oversize aperture 85 in the resilient strip. The threads 66 of each adjustment tool 40 engage threaded bores 67 in the adjustment plate 36 (see FIG. 7). A plurality of fasteners 86 are provided for securing the adjustable footer assembly 60 to the rounder bar assembly (see FIG. 2). The spaced apart adjustment tools 40 of adjustable footer assembly 60 enables zonal adjustment of the blade 38 of the rounder bar assembly 20 with respect to a conveyor belt 22 (see FIG. 1) in order to eliminate dough leakage in a selected zone on the rounder bar assembly 20. The spaced apart adjustment tools 40 enable adjustment of specific zones of the rounder bar blade to compensate for wear or an irregularity in the bed of the conveyor belt of a dough forming machine.

Figure 12:
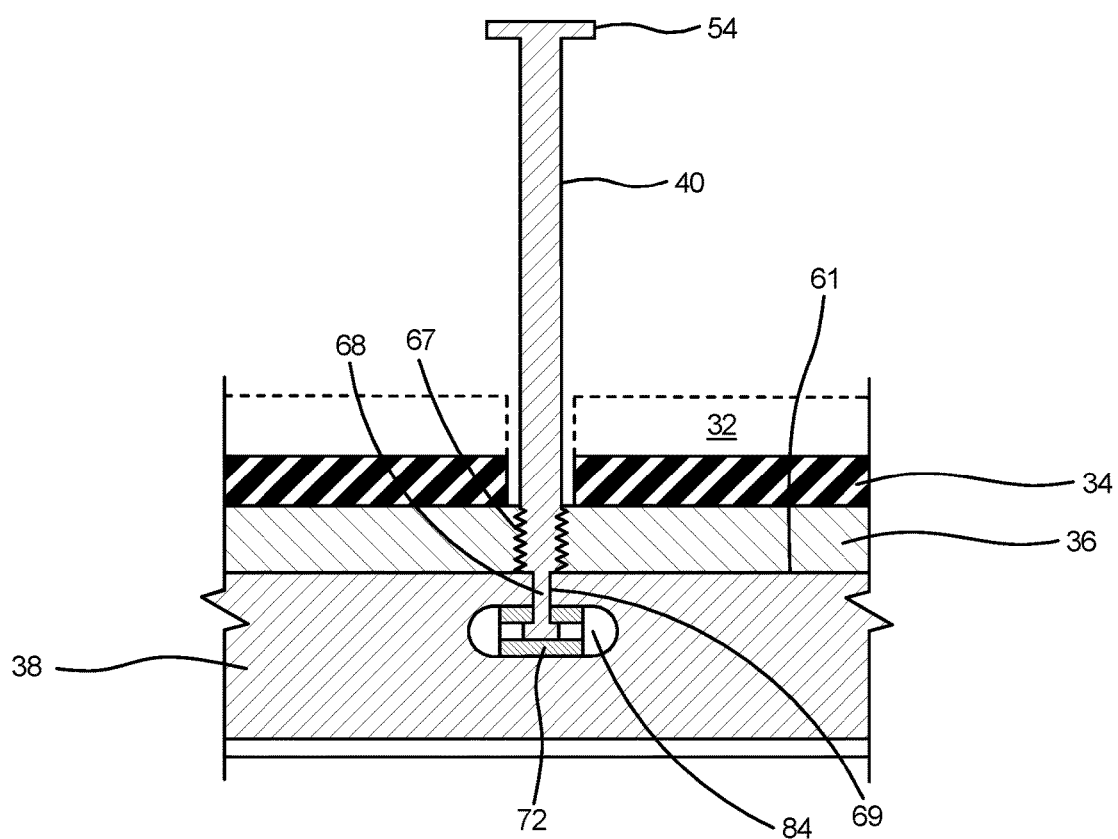
FIG. 12 is a sectional view of the adjustable footer assembly taken along line 12-12 of FIG. 10.

Referring to FIG. 12, which depicts a typical zone of the rounder bar assembly 20 according to the invention, the resilient strip 34 provides a compressible/expandable layer between the rounder bar body 32 and the adjustable plate 36. To operate the invention as the dough-shaper is running, the adjustment tool 40 for any particular zone across the rounder bar may be rotated in the desired direction to adjust that zone of the blade 38 either closer or farther away from the conveyor belt surface to compensate for dough leakage caused by irregularities in the conveyor belt surface. As an example, if a lengthwise trough is formed in the conveyor belt surface, the adjustment tool 40 may be rotated clockwise to urge the locking plate 72 and blade 38 closer to the belt in that zone.

Thus, as shown in FIG. 12, there is intimate contact between the blade 38 and adjustment plate 36, between the adjustment plate 36 and resilient strip 34, and between the resilient strip 34 and the rounder bar body 32.

Rounder bar body 32 can be constructed of plastic or metal. If constructed of metal, rounder bar body is most preferably constructed of aluminum. If constructed of plastic, the rounder bar body is preferably constructed of ultra-high molecular weight polyethylene (UHMWPE), and most preferably is constructed of TIVAR® oil-filled UHMWPE, which is an oil-impregnated UHMWPE available from Quadrant Engineering Plastic Products USA, of Reading, Pa. The oil-impregnated UHMWPE functions to prevent sticky dough from adhering to the working face of the rounder bar and meets FDA regulations for direct food contact. The adjustment plate 36 is preferably constructed of steel. The resilient layer 34 is preferably constructed of silicon sponge rubber. The blade 38 is preferably constructed of metal, such as aluminum.

Although the description above contains many specific descriptions, materials, and dimensions, these should not be construed as limiting the scope of the invention but as merely providing illustrations of some of the embodiments of this invention. Thus the scope of the invention should be determined by the appended claims and their legal equivalents, rather than by the examples given.

What is claimed is:

1. A rounder bar for use with a conveyor, comprising:
   a body with a working face for cooperation with the conveyor for defining a pocket for dough to be formed;
   a slot extending through the length of the rounder bar, said slot including a top end and an open end;
   a resilient strip disposed in said top end of said slot;
   an adjustment plate disposed in said slot in contact with said resilient strip; and
   a blade disposed in said open end of said slot for wiping a surface of said conveyor.

2. The rounder bar of claim 1, further comprising:
   a plurality of adjustment tools spaced along the length of said body; and
   a plurality of recesses in said blade, each of said recesses in axial alignment with a corresponding one of said adjustment tools.

3. The rounder bar of claim 2, further comprising a locking plate disposed in each of said recesses of said blade.

4. The rounder bar of claim 3, further comprising:
   a proximal and distal end on each of said adjustment tools; and
   a flange on said distal end of each of said adjustment tools for engaging said adjustment plate.

5. The rounder bar of claim 4, further comprising an adjustable footer assembly including said adjustment tools, said locking plates, said resilient strip, said adjustment plate, and said blade, said adjustable footer assembly enabling zonal adjustment of said blade with respect to the surface of said conveyor.

6. The rounder bar of claim 5, further comprising:
   a support plate including oversize apertures for supporting said body of said rounder bar; and said adjustment tools of said adjustable footer assembly extending through said oversize apertures of said support plate enabling free rotation of said adjustment tools with respect to said support plate.

7. The rounder bar of claim 2, further comprising oversize apertures in said resilient strip, said oversize apertures of said resilient strip enabling free rotation of said adjustment tools with respect to said resilient strip.

8. The rounder bar of claim 6, further comprising attachment means for securing said body to said support plate.

9. The rounder bar of claim 2, further comprising a grasping means on each of said adjustment tools, said grasping means enabling manual or tool-assisted gripping of said adjustment tools.

10. The rounder bar of claim 4, further comprising:
said distal end of each of said adjustment tools including threads; and
said adjustment plate including threaded bores adapted for threaded engagement of said adjustment tools.

11. A rounder bar for use with a conveyor, comprising:
a body with a working face for cooperation with the conveyor for defining a pocket for dough to be formed;
a slot extending through the length of the rounder bar, said slot including a top end and an open end;
a resilient strip disposed in said top end of said slot;
an adjustment plate disposed in said slot in contact with said resilient strip;
a blade disposed in said open end of said slot for wiping a surface of said conveyor;
a plurality of adjustment tools spaced along and extending from the length of said body; and
an adjustable footer assembly including said plurality of adjustment tools, said resilient strip, said adjustment plate, and said blade, said adjustable footer assembly enabling zonal adjustment of said blade with respect to the surface of said conveyor.

12. The rounder bar of claim 11, wherein said adjustable footer assembly further comprises a plurality of recesses in said blade, each of said recesses in axial alignment with a corresponding one of said adjustment tools.

13. The rounder bar of claim 12, further comprising a locking plate disposed in each of said recesses of said blade.

14. The rounder bar of claim 11, further comprising:
a distal end on each of said adjustment tools; and
threads on each of said distal ends of said adjustment tools.

15. The rounder bar of claim 14, further comprising:
a pin extending from each of said distal ends of said adjustment tools; and
a flange on each of said pins of said adjustment tools.

16. A rounder bar for use with a conveyor, comprising:
a body with a working face for cooperation with the conveyor for defining a pocket for dough to be formed;
a slot extending through the length of the rounder bar, said slot including a top end and an open end;
a resilient strip disposed in said top end of said slot;
an adjustment plate disposed in said slot in contact with said resilient strip;
a blade disposed in said open end of said slot for wiping a surface of said conveyor;
a plurality of adjustment tools spaced along and extending from the length of said body; and
a plurality of recesses in said blade, each of said recesses in axial alignment with a corresponding one of said adjustment tools.

17. The rounder bar of claim 16, further comprising a locking plate disposed in each of said recesses of said blade.

18. The rounder bar of claim 17, further comprising a flange on each of said adjustment tools, each of said flanges of said adjustment tools engaging a corresponding one of said locking plates of said blade thereby enabling zonal adjustment of said blade with respect to the surface of said conveyor.

19. The rounder bar of claim 18, further comprising a pin extending from said adjustment tool to said flange.

20. The rounder bar of claim 17, wherein each of said locking plates further comprise:
a top leg;
a bottom leg;
a base; and
a slot defined by said top leg and said bottom leg.

* * * * *